United States Patent [19]

Lim et al.

[11] 4,333,857

[45] Jun. 8, 1982

[54] ATTRITION RESISTANT ZEOLITE CONTAINING CATALYST

[75] Inventors: John Lim, Anaheim; Michael Brady, Studio City; Dennis Stamires, Newport Beach, all of Calif.

[73] Assignee: Filtrol Corporation, Los Angeles, Calif.

[21] Appl. No.: 130,715

[22] Filed: Mar. 17, 1980

Related U.S. Application Data

[63] Continuation-in-part of Ser. No. 3,407, Jan. 15, 1979, Pat. No. 4,086,187.

[51] Int. Cl.$^3$ .......................... B01J 29/08; B01J 35/08
[52] U.S. Cl. ................................................ 252/455 Z
[58] Field of Search ..................................... 252/455 Z

[56] References Cited

U.S. PATENT DOCUMENTS

| | | | |
|---|---|---|---|
| 3,065,054 | 11/1962 | Haden, Jr. et al. | 252/455 Z |
| 3,323,876 | 6/1967 | Arey, Jr. et al. | 252/455 Z |
| 3,324,048 | 6/1967 | Plank et al. | 252/455 Z |

*Primary Examiner*—Carl F. Dees
*Attorney, Agent, or Firm*—Paul E. Calrow; Andrew E. Barlay; Philip Subkow

[57] ABSTRACT

An improvement in abrasion resistance is obtained in zeolite compositions containing alumina and clay in a matrix by employing comminuted zeolites.

17 Claims, No Drawings

ATTRITION RESISTANT ZEOLITE CONTAINING CATALYST

This is a continuation-in-part of Ser. No. 003,407, filed Jan. 15, 1979, now U.S. Pat. No. 4,086,187.

BACKGROUND OF THE INVENTION

Cracking catalysts of the prior art which include faujasite zeolites of the X and Y type have been formed by spray drying a slurry of the zeolite and a matrix. The matrix may include alumina or silica-alumina gels or other organic oxide gels and clays or mixtures thereof.

Cracking catalysts containing the faujasite type zeolite known as zeolite Y, (see Breck U.S. Pat. No. 3,130,007 patent) and containing also alumina and clay and ammonium polysilicate (See Lim et al, U.S. Pat. No. 4,086,187) when produced by spray drying of a water slurry of the above components in the form of microspheres will have a suitable attrition resistance provided that the alumina is in the form of a hydrate having suitable rheological properties as set forth in co-pending application, Ser. No. 003,407, filed Jan. 15, 1979 now U.S. Pat. No. 4,086,187, incorporated herein by this reference, of which this application is a continuation-in-part.

The pseudoboehmites are classified in said application as type A and type B according to a test procedure described in said application. Said application is incorporated in this application by this reference. See also Lim et al, U.S. Pat. No. 4,086,187.

The problem of obtaining such catalyst which are of suitable attrition properties are discussed in said co-pending applications, and in said patent. The prior art cited and referred to in said application and Patent are also included in the statement of the Background.

STATEMENT OF THE INVENTION

We have now discovered that microspheres (average particle diameter is 50 to 70 microns) produced by spray drying water slurries of zeolite compositions which include a matrix such as referred to above, particularly employing either A type pseudoboehmite alone or mixtures of A type and a comminuted B type pseudoboehmite which is described in the aforesaid application, may be further improved in their attrition resistance by employing an exchanged zeolite in which the crystals of the smaller diameters are substantially greater than as originally produced by the exchange. The zeolite in a water slurry is comminuted in our process to increase the fraction of the particles of the smaller diameter.

The comminution of the zeolite crystals or the zeolite may be accomplished by any comminuting means such as is employed in the prior art for reduction in the size of particulate matter. Any mechanical, sonic, or chemical means may be employed to substantially increase the fraction of particles of the zeolite which are of the smaller diameters, provided that the crystal character of the zeolite is not materially impaired. Preferably we employ means for mechanically working the zeolite in a water slurry by means of a mill, such as a colloid mill, to a degree so as to materially increase the percent of the particles that are less than 3 microns in equivalent diameter as determined by the test procedure referred to below. The milling raises the temperature of the slurry of the zeolite. A further improvement in the attrition resistence of the microspheres is attained by also suitably working the slurry of the components of the spray dried feed, as for example by milling the slurry to cause a temperature change which is substantially of the order of that resulting from the milling of the zeolite slurry. Suitable temperature rise, we have found, employing a stone type colloid mill is in the range of about 10° F. to about 30° F.

When such a milled zeolite is combined with a peptized pseudoboehmite of the A type, (peptized as described in the said co-pending application) and particularly when in a slurry of the milled zeolite and clay and this slurry is then milled again to a temperature rise in the range of about 10° F. to about 30° F. temperature, the spray drying results in a microsphere of superior attrition resistence.

As in the case of the compositions of the above co-pending application, we may incorporate into the above mixture without substantial imparement of the attrition resistence of the microspheres a milled type B pseudoboehmite. The particle size distribution of a milled and unmilled type B pseudoboehmite is given in said co-pending application. A suitable milling as above will raise the temperature of the type B slurry in the range of about 10° F. to about 30° F. For example, in a suitably milled type B pseudoboehmite 50% of the particles are of equivalent diameter less than 2 microns and about 90% under 4.5 microns.

The procedure for peptizing the pseudoboehmite and for measuring the various parameters according to the various test procedures in this application are also given is said co-pending application.

It is, therefore, our invention to formulate a cracking catalyst by spray drying a slurry formed of a milled Y zeolite preferably having a particle size of which more than about 55% of the particles have an equivalent diameter less than 3 microns and are substantially less than the percentage of particles of such equivalent diameter as are formed in the Y zeolite as produced by the conventional crystallization procedures, see Breck patent, supra, in which the particle equivalent diameter is less than 3 microns, are substantially in excess of 55% of the particles of the Y crystals.

Preferably, the slurry includes, in addition to the milled zeolite, alumina, clay, and either ammonium polysilicate or a silica sol of suitable particle size, as described in the co-pending application. Other attrition resistance improving additives may be used, as for example, the S.M.M. of U.S. Pat. No. 4,086,187, referred to above. We may instead of using only the peptized type A pseudoboehmite use in place of part of the type A pseudoboehmite a milled type B pseudoboehmite or a milled and peptized type B pseudoboehmite.

A further improvement in the attrition index is obtained when using the above milled zeolite.

The slurry containing the zeolite, pseudoboehmite and clay and ammonium polysilicate or a silica sol is also suitably milled. While slurries of zeolite, alumina, clay, etc., not containing the milled zeolite or the milled type B alumina have been homogenized by passing through a colloid mill, the degree of milling of the slurry has not been controlled. We have found that in order to obtain the degree improvement in the attrition resistance of the microspheres, attained by milling the slurry. The milling must be controlled. We have found that the milling the spray dried slurry should be sufficient to raise the temperature at least 10° F. and preferably in the range of 10° F. to about 30° F. Such a temperature rise may be obtained by milling a slurry containing from about 15% to about 35% of solids in the slurry of the zeolite or the type B alumina or the zeolite matrix slurry which is the feed to the spray dried. In such case, a significant improvement in the attrition resistance of the microspheres is attained.

In the catalyst, the zeolite preferably of a $SiO_2/Al_2O_3$ molar ratio of a Y zeolite is in the range from about 10% to about 50%, preferably about 20% to about 40%. The type A alumina when used as the only alumina type or the mixed types A and B together will range from about 10% to about 50%, preferably from about 15% to about 40%. The ammonium polysilicate (as $SiO_2$) may range from about 5% to about 30%, preferably about 10% to about 15%. The type B alumina may, but need not be incorporated but if used, we prefer that it be used in the milled state, and it may be but need not be peptized. If used, we prefer to use it in a ratio to type A alumina in the range of from about 15 to about 60% of the combined type A and type B, preferably from about 10% to about 50% and kaolin clay, preferably 20% to 40%. All percentage are by weight on a volatile free basis. The components and ratios are preferably chosen so that the Attrition Index is less than 20. The test procedure is described in Lim, et al, U.S. Pat. No. 4,086,187.

EXAMPLE I

A slurry of 10.0 weight percent solid of a sodium Y faujasite (silica to alumina ratio of 4.8), adjusted to a pH of 5-6 with sulfuric acid, was mixed into an ammonium sulfate solution of 70 weight percent of solid ammonium sulfate per volatile free sodium Y. Exchange slurry pH was 4-5.

This slurry was vigorously stirred for one hour at room temperature, filtered and washed until no sulfate was observed in the final wash water. The filter cake of ammonium exchanged Y was reslurried to 10% solid. A solution containing rare earth oxide ($RECl_3$) was mixed with the sodium Y in weight ratio on the volatile free basis of 10% of the ammonium exchanged faujasite. The exchanged slurry was kept in the pH range of 4.0 to 5.0, at ambient temperature for one hour. The slurry was filtered and washed. The resulting zeolite had the following cation composition on a volatile free basis.
$Na_2O = 3.78$ wt.%
$NH_3 = 1.00$ wt.%
$ReO = 12.6$ wt.%.

EXAMPLE II

The ammonium-rare earth ion exchanged zeolite of Example I was dried to a volatile matter content less than 15 wt.% then cooled and slurried in water to 10.0 wt.% solid. This slurry was mixed with a rare earth chloride solution. The exchange was performed at ambient temperature for an hour, while the pH of the slurry was maintained at 4.0.

The slurry was filtered and washed until the chloride free of the washing solution. The resulting zeolite had the following composition on a volatile free basis:
$Na_2O = 1.78$ wt.%
$NH_3 = 0.41$ wt.%
$ReO = 14.4$ wt.%.

EXAMPLE III

The ammonium exchanged zeolite of Example I was again ammonium exchanged twice more as in Example I. The final ammonium exchange was carried out as in Example I. After each exchange, the respective slurry was filtered and the filtrate washed until the wash water was sulfate free. The resulting ammonium exchanged zeolite contained on a volatile free basis:
$Na_2O = 2.25$ wt.%
$NH_3 = 4.95$ wt.%.

EXAMPLE IV

A mixture composed of 15.15% of the exchanged zeolite of Example I, and 60.6% of the exchanged zeolite of Example II and 24.24% of the exchanged zeolite of Example III (all percentages on a volatile free basis) were mixed in a water slurry. The slurry was divided into four portions.

The above zeolite was tested by the Sedi Graph instrument described in "A Matter of Sub 'Particulate' Importance" by J. V. Southwick, in Industrial Research/Development, September 1979, pages 146 etc. Particle size determination of the crystallized Y is given in Table 1. One portion of the sample 1 zeolites was milled in a colloid type mill with sufficient work imparted in the slurry of (20% to 30% solids) to raise the temperature of the slurry 10° F. This is sample 2. Another portion of the sample 1 was milled as in the case of sample 2, but in this case the work done on the slurry was sufficient to raise the temperature to 20° F. (This is sample 3.) Another portion of sample 1 was again milled as previously, but in this case the work done on the slurry was sufficient to raise the temperature 30° F. Each of these samples were analyzed by the Sedi Graph method with the following results. See Table 1.

TABLE 1

| Range of Equivalent Diameters in Microns | Percent of Total | | | |
| --- | --- | --- | --- | --- |
| | Sample 1 | Sample 2 | Sample 3 | Sample 4 |
| Less than 0.2 | 3 | 4 | 4 | 4 |
| 0.2 and less than 0.5 | 5 | 5 | 5 | 5 |
| 0.5 and less than 1.0 | 11 | 11 | 14 | 14 |
| 1.0 and less than 1.5 | 10 | 12 | 15 | 16 |
| 1.5 and less than 2.0 | 9 | 9 | 10 | 14 |
| 2.0 and less than 3.0 | 15 | 17 | 18 | 20 |
| 3.0 and less than 4.0 | 15 | 14 | 14 | 12 |
| 4.0 and less than 5.0 | 10 | 10 | 9 | 7 |
| 5.0 and less than 6.0 | 7 | 6 | 4 | 5 |
| 6.0 and less than 7.0 | 5 | 5 | 4 | 1 |
| 7.0 and less than 8.0 | 3 | 2 | 1 | 1 |
| 8.0 and less than 9.0 | 2 | 2 | 1 | 1 |
| 9.0 and less than 10.0 | 1 | 0 | 0 | 0 |
| 10.0 and less than 15.0 | 3 | 1 | 1 | 0 |

It will be observed in Table 2 that there is a linear relationship between the temperature rise during milling and the increase in the percent of the particles which are less than 3 microns to wit an average of about 7% per 10° F. rise in temperature. This relation may be taken as a significant definition of the effective temperature rise during milling in terms of the particle size as used in this specification and claims.

TABLE 2

| | Temperature Rise On Milling | | | |
| --- | --- | --- | --- | --- |
| | 0° F. | 10° F. | 20° F. | 30° F. |
| % Particles of Less Than 3 Microns Equivalent Diameter | 53 | 58 | 66 | 73 |

EXAMPLE V

A series of fluid catalytic cracking catalysts was prepared by using 18.0% Type A pseudoboehmite, 12.0% volatile free Type B pseudoboehmite, 30.0% ball clay, 7.0% ammonium polysilicate acid (SiO$_2$=5.99 wt.%), 33% of the zeolite mixture of Example IV. (All percentages are by weight, on a volatile free basis.) These components were vigorously mixed with the Type A and Type B alumina peptized with formic acid (0.0023 equivalents per gram of the Al$_2$O$_3$ on a volatile free basis) for thirty (30) minutes as above. This was followed by the addition of ball clay, pre-blended zeolite and ammonium polysilicate acid which were vigorously mixed.

In sample 1, neither the zeolite, the Type B, nor the spray dried slurry were milled. The Attrition Index was 50.

In sample 2, the zeolite mixture was milled (slurry of the zeolites contained 28% solid and was milled to raise the temperature 20° F.), but neither the Type B nor the spray dried slurry were milled. The Attrition Index was 42.

In sample 3, the zeolite mixture was milled as in sample 2, and Type B was milled. (The slurry of Type B contained 20% solids, was milled to raise the temperature 15° F.), but the spray dried feed was not milled. The Attrition Index was 23.

In sample 4, the zeolite mixture and Type B were milled as in sample 3, and the spray drier feed slurry was milled for a 20° F. rise in temperature. The slurry contained 20% solids. The Attrition Index was 10.

The spray dried catalyst of the example when tested by the micro activity test, described in Appendix A (attached herewith), had the following results:

| Samples | M | S | S+ |
| --- | --- | --- | --- |
| 2 | 87 | 76 | 44 |
| 3 | 81 | 76 | 33 |

EXAMPLE VI

A pair of catalysts was made in the following composition but with or without milling the zeolite blend as Example V. The composition on a volatile free basis was as follows:

| | |
| --- | --- |
| Type A alumina | 24% |
| Type B alumina for a temperature rise of 200° F. | 12% |
| Ball Clay | 21% |
| NH$_4$ PSA (As SiO$_2$) Ammonium polysilicate | 10% |
| Zeolite Blend of Example IV | 33% |

The preparation containing zeolite milled as in sample 2 of Example IV produced catalysts of an Attrition Index of 34 compared to that without milled zeolite with an Attrition Index of 50. The spray dried feed slurries were not milled. The Type A alumina was peptized as in Example IV.

EXAMPLE VII

Another pair of catalysts were made as in Example V but with the following composition, on a volatile free basis.

| | |
| --- | --- |
| Type A alumina as in Example V | 20% |
| Ball Clay | 37% |
| Ammonium polysilicate (as SiO$_2$) | 10% |
| Zeolite Blend of Example IV | 33% |

For these preparations, the zeolite blend as in Example IV was milled as in sample 2 of Example IV to a temperature rise of 20° F. The preparation with milled spray dried feed slurry (20% solids milled to a 20° F. temperature rise) produced a catalyst of an Attrition Index of 14 but the one in which the spray dried feed slurry was not milled produced a catalyst of an Attrition Index of 27.

EXAMPLE VIII

Another pair of catalysts were made as in Example V with the following compositions.

| | |
| --- | --- |
| Type A alumina, peptized as in Ex. V | 18% |
| Type B, milled, for a temp. rise of 15° F. | 12% |
| Ball Clay | 25% |
| NH$_4$ polysilicate (as SiO$_2$) | 10% |
| Zeolite of Example II | 35% |

The zeolite was milled to a temperature rise of 20° F. in a 28% solids slurry. The preparation made with the Type B alumina (milled as in sample 3 of Example V) had an Attrition Index of 21 while the same preparation with the further milling of a 20% solids spray dried feed slurry (20° F. rise) produced a catalyst of an Attrition Index of 12.

EXAMPLE IX

The zeolite of Example VIII was formulated as in Example VIII. The slurry contained 28% solids content and was milled to raise the temperature 20° F. The spray drier feed slurry (slurry 20% solids) was also milled to raise the temperature 20°. The type B alumina (slurry of 20% solids content) was milled to raise the temperature 20° F. The milled components were combined as in Example VIII. This is sample 1. Attrition Index of sample 1 microspheres was 12.

Sample 2 was formed as sample 1 except that the slurry of the zeolite was not milled as in sample 1. The Attrition Index of the microspheres of sample 2 was 21.

The above data shows that in a spray dried zeolite catalyst of the Y type, in which the matrix contains Type A alumina and kaolin clay and ammonium polysilicate, that the attrition index of the resultant microspheres are improved by suitable milling of the zeolite. A further improvement is obtained by suitably milling a slurry containing the above components prior to spray drying.

It is therefore our invention to formulate a faujasite type of zeolite preferably of the Y type by employing a matrix composed of a pseudoboehmite and clay and ammonium polysilicate or a silica sol having silica of average particle size of less than about 5 millimicrons and to employ in such a system a faujasite type zeolite of which more than about 55% of the particles have an equivalent diameter as described above of less than 3 microns. Our invention also includes such catalyst spray dried slurry compositions which contain type A pseudoboehmite or mixtures of type A alumina and type B pseudoboehmite which has been milled and kaolin clay. Supplementary aids to improve the Attrition Index may be employed, preferably such as the ammonium polysilicate or silica sol. All as described in the above patent and patent application.

The zeolite is suitably produced by milling the zeolite in a colloid mill to raise the temperature of a water slurry of the zeolite containing from about 20 to 30% solids to raise the temperature of the slurry in the range of about 18° F. to about 30° F. This milled zeolite is combined with a matrix comprising type A, peptized as described in the above copending application, and with clay in a slurry. To this slurry we prefer to add ammonium polysilicate in amounts of about 5% to about 15% (expressed as the equivalent $SiO_2$ on a volatile free basis) as described above. Preferably, the water slurry is also colloid milled prior to spray drying to raise its temperature in the range of about 10° F. to about 30° F. and then spray dried.

Typical Attrition Indexes of such spray dried microspheres are from about 20 to about 30 when only the zeolite slurry is milled to the above degree, i.e. to a temperature rise in the range of about 10° to about 30° F., and if both the slurry of zeolite and the spray drier feed are milled to a temperature rise of about 15° to 20° F., the Attrition Index of the microspheres is in the range of about 10 to about 15. Typical microactivities by the above test will depend on the concentration of zeolite, in the mixture of zeolite and a matrix composed of the above aluminas, clay and ammonium polysilicate described will range from about 75 to 85% for M steaming and 20 to 50 for S+ steaming.

Instead of using the type A alone in the matrix, part of the type A pseudoboehmite may be replaced by milled or milled and peptized type B, as described above in co-pending application Ser. No. 003,407.

Our presently preferred embodiment of the process for producing said catalyst of our invention is illustrated by the following example.

The zeolite of Example IV was milled in a slurry containing 28% solids, to a temperature rise of 20° F. and the milled slurry combined with Type A pseudoboehmite and clay and ammonium polysilicate.

| | |
|---|---|
| Type A alumina as in Example V | 20% |
| Ammonium polysilicate (As $SiO_2$) | 10% |
| Ball Clay | 37% |
| Zeolite as above | 33% |

All percentages by weight on a volatile free basis. The slurry containing 20% solids was milled to a 20° F. temperature rise and spray dried to form microspheres of 50–70 micron average particle size.

The catalysts formulated as described above, are active cracking catalysts for the cracking of oils such as petroleum for production of gasoline and other like fractions in conventional fluid cracking systems, as will be understood by those skilled in the art.

The catalysts produced according to our invention are not only of good attrition resistance, but also have superior cracking activity and stability as is shown by the M and S+ values set forth above.

APPENDIX A

MICRO-ACTIVITY TEST

A test oil (ASTM Subcommittee D-32, Standard FHC 893) is vaporized and passed through a bed of microspheres produced by spray drying of the catalyst. Spray dried microspheres of the catalyst are of a particle size within the range of 50–70 microns.

The catalyst charge is 4.00±0.05 grams and 1.33±0.03 grams of oil is passed through the catalyst bed over a period of 75 seconds. The catalyst is prepared by heating a shallow bed of the catalyst for three (3) hours in air at 1050° F. and then steamed for two (2) hours at 1450° F. and another sample is steamed at 1500° F. for two (2) hours and another sample is steamed at 1550° F. for two (2) hours. The oil passed through a preheat zone and through a bed of the microspheres maintained at a temperate of 900°±2° F. at a weight hourly space velocity (WHSV) of 1.6.

The vapors and gases passing from the bed are condensed in an ice bath and the uncondensed gases collected over water.

The following observations are made. The weight of the condensate and the volume and temperature of the gases are determined. The liquid condensate fraction is analyzed and the percent by weight of the liquid fraction which is boiled above 421° F. is determined. The volume and temperature of the gases collected over the water are measured and the volume reduced to standard conditions. The uncondensed gases are analyzed and the weight percent of the gases which is hydrogen, isopentane, and hexanes is determined and their weight percent of the feed determined. The weight percent of the liquid charge is determined from the following relation:

F is the weight of the oil passing through the reactor;

L is the weight of the liquid product which is collected as condensate;

R is the percent by weight of the fraction of the liquid condensate which boils above 421° F.;

H is the grams of liquid held up in the reactor exit line and around the reactor, receiver and joints.

In the above test, it has been determined that it constitutes three (3) percent of the feed F. The weight percent conversion (%C) is given by the following relationship.

$$\%C = \frac{F - \frac{R \times L}{100} - .03F}{F} \times 100$$

The percent conversion using the catalyst steamed at 1450° F. is termed M conversion, the one steamed at 1500° F. is termed S conversion, and the one steamed at 1550° F. is termed S+ conversion.

We claim:

1. A process for forming a hydrocarbon conversion catalyst comprising comminuting crystals of a zeolite of the faujasite type and combining the comminuted zeolite with pseudoboehmite, clay and ammonium polysilicate or silica sol in a water slurry, spray drying said water slurry and forming microspheres.

2. The process for producing microspheres of hydrocarbon conversion catalyst comprising comminuting crystals of a Y type zeolite in amount in the range of about 10% to about 50% and combining said comminuted zeolite in a slurry containing about 10% to about 50% pseudoboehmite, and ammonium polysilicate or silica sol, the amount of said ammonium polysilicate or silica sol expressed as the equivalent $SiO_2$ being in the range of about 5% to about 30% and kaolin clay in the range of from about 10% to about 30% and spray drying said slurry to form microspheres, said percentages being by weight based on the microspheres on a volatile free basis, comminuting the said slurry and spray drying said comminuted slurry.

3. A process for producing a hydrocarbon cracking catalyst comprising comminuting a Y type zeolite in a water slurry, comminuting a Type B pseudoboehmite in a water slurry and combining said comminuted zeolite, a type A pseudoboehmite and said comminuted Type B pseudoboehmite with kaolin clay and ammonium polysilicate in a water slurry, said last named water slurry containing from about 10% to about 30% of said comminuted zeolite and said pseudoboehmite each being in the range of about 10% to about 50% and said pseudoboehmite including both Type A pseudoboehmite and comminuted Type B aluminas and said catalyst also including from about 5% to about 30% of $SiO_2$ equivalent to the ammonium polysilicate and from about 10% to about 50% of kaolin clay, and spray drying said slurry to form microspheres, all percentages based on the weight of the microspheres.

4. A process for producing microspheres of hydrocarbon conversion catalyst comprising comminuting crystals of a Y type zeolite in amount in the range of about 10% to about 50% and combining said comminuted zeolite in a slurry containing about 10% to about 50% pseudoboehmite, and ammonium polysilicate or silica sol, the amount of said ammonium polysilicate or silica sol expressed as the equivalent $SiO_2$ being in the range of about 5% to about 30% and kaolin clay in the range of from about 10% to about 30% comminuting said combination of comminuted zeolite and pseudoboehmite, ammonium polysilicate or silica sol and clay and spray drying said slurry to form microspheres, said percentages being by weight based on the microspheres on a volatile free basis.

5. A process for producing a hydrocarbon cracking catalyst comprising comminuting a Y type zeolite in a water slurry, comminuting a Type B pseudoboehmite in a water slurry and combining said comminuted zeolite, a type A pseudoboehmite and said comminuted Type B pseudoboehmite with kaolin clay and ammonium polysilicate in a water slurry, said last named water slurry containing from about 10% to about 30%, said comminuted zeolite and said pseudoboehmite each being in the range of about 10% to about 50% and said pseudoboehmite including both Type A pseudoboehmite and comminuted Type B aluminas and said catalyst also including from about 5% to about 30% of $SiO_2$ equivalent to the ammonium polysilicate from about 10% to about 50% of kaolin clay, comminuting said combination of zeolite, pseudoboehmite, clay and ammonium polysilicate and spray drying said slurry to form microspheres, all percentages based on the weight of the microspheres.

6. The process of claims 1, 2, 3, 4 or 5, in which comminution of the zeolite increases the percentage of particles of less than three (3) microns to produce a zeolite.

7. The process of claims 1, 2, 3, 4 or 5, in which the comminution of the zeolite crystals is by milling a slurry of the zeolite to increase the percent of particles of crystals which are less than three (3) microns to 55% or greater percentage.

8. The process of claims 1, 2, 3, 4 or 5, in which the comminution of the zeolite is by milling a slurry of the zeolite containing from about 15% to about 35% solids and said milling raises the temperature of the slurry in the range of from about 10° F. to about 30° F.

9. The process of claims 1, 2, 3, 4 or 5, in which the said zeolite is comminuted by milling a slurry of the zeolite containing from about 15% to about 35% of solids, said milling increasing the fraction of particle size of the zeolite that are less than about three (3) microns from substantially less than about 55% to substantially more than 55%.

10. The process of claims 1, 2, 3, 4, or 5, in which the zeolite is comminuted by milling a slurry of the zeolite containing about 15% to about 35% of solids, said milling raising the temperature of the slurry in the range of about 10° F. to about 30° F. and increasing the percent of the zeolite crystals that are less than three microns.

11. A hydrocarbon conversion catalyst in the form of microspheres having an average particle size diameter from about 50 to 70 microns derived by spray drying a water slurry consisting of a comminuted zeolite of the Y type having an $SiO_2/Al_2O_3$ molar ratio in excess of 4 and sodium as $Na_2O$ of less than about 5% of the zeolite on a volatile free basis, and a matrix, said matrix including more than about 15% by weight of alumina derived from pseudoboehmite, and from about 5% to about 30% by weight of $SiO_2$ derived from ammonium polysilicate or silica sol and from about 0% to about 30% of clay, said weight percentage based on the weight of the zeolite and matrix on a volatile free basis.

12. A hydrocarbon conversion catalyst in the form of microspheres having an average particle size diameter from about 50 to 70 microns derived by spray drying a water slurry comprising a comminuted zeolite of the Y type and a matrix, said matrix including alumina derived from pseudoboehmite, said pseudoboehmite composed of Type A and comminuted Type B alumina, and $SiO_2$ derived from ammonium polysilicate and clay.

13. A hydrocarbon conversion catalyst in the form of microspheres having an average particle size diameter from 50 to 70 microns derived by spray drying a water slurry comprising comminuted zeolite of the Y type having an $SiO_2/Al_2O_3$ molar ratio in excess of 4 and sodium as $Na_2O$ of less than about 5% of the zeolite on a volatile free basis, and a matrix, said matrix including more than about 15% by weight of alumina derived from pseudoboehmite, and from about 5% to about 30% by weight of $SiO_2$ derived from ammonium polysilicate or silica sol and from about 0% to about 30% of clay, said weight percentage based on the weight of the zeolite and matrix on a volatile free basis.

14. The catalyst of claims 11, 12, or 13, in which the comminuted zeolite is composed of particles more than about 55% of which are of three (3) microns or less diameter.

15. A hydrocarbon conversion catalyst in the form of microspheres derived from spray drying a water slurry comprising zeolite of the faujasite type, more than about 55% of the zeolite crystals being less than about three (3) microns, and a matrix, said matrix including alumina derived from pseudoboehmite, said microspheres containing $SiO_2$ derived from ammonium polysilicate or silica sol having particles of average particle size of less than 5 millimicrons and clay, said catalyst having an Attrition Index of less than about 20.

16. A hydrocarbon conversion catalyst in the form of microspheres, derived from spray drying a water slurry, comprising zeolite of the faujasite type, more than about 55% of the crystals of the zeolite being less than about three (3) microns, and a matrix, said matrix including more than about 15% by weight of alumina derived, from acidified pseudoboehmite, and from about 5% to about 30% by weight of $SiO_2$ derived from ammonium polysilicate or silica sol having particles of average size less than 5 millimicrons and from about 10% to about 30% of clay, all weight based on the weight of the zeolite and matrix on a volatile free basis, said catalyst having an Attrition Index less than about 20.

17. The catalyst of claim 16, in which the zeolite is a Y zeolite.

* * * * *